United States Patent
Chizgi et al.

(10) Patent No.: US 9,510,218 B2
(45) Date of Patent: Nov. 29, 2016

(54) DEVICES AND METHODS FOR FACILITATING CLOSED-LOOP TRANSMISSION DIVERSITY IN WIRELESS COMMUNICATIONS SYSTEMS

(71) Applicant: QUALCOMM Incorporated, San Diego, CA (US)

(72) Inventors: Nate Chizgi, Sunnyvale, CA (US); Wei Zhang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 14/267,773

(22) Filed: May 1, 2014

(65) Prior Publication Data

US 2015/0092577 A1   Apr. 2, 2015

Related U.S. Application Data

(60) Provisional application No. 61/885,888, filed on Oct. 2, 2013.

(51) Int. Cl.
| | |
|---|---|
| G06F 11/00 | (2006.01) |
| H04W 24/08 | (2009.01) |
| H04B 7/06 | (2006.01) |
| H04L 1/00 | (2006.01) |
| H04L 1/20 | (2006.01) |

(52) U.S. Cl.
CPC .......... *H04W 24/08* (2013.01); *H04B 7/0619* (2013.01); *H04B 7/0654* (2013.01); *H04L 1/0021* (2013.01); *H04L 1/0055* (2013.01); *H04L 1/206* (2013.01)

(58) Field of Classification Search
CPC ... H04L 1/0021; H04L 1/0055; H04L 1/206; H04W 24/08; H04B 7/0619; H04B 7/0654
See application file for complete search history.

(56) References Cited

U.S. PATENT DOCUMENTS 5,636,253 A * 6/1997 Spruyt .................... H04L 1/206
329/304
6,831,943 B1 * 12/2004 Dabak .................. H04B 7/0615
375/147

(Continued)

FOREIGN PATENT DOCUMENTS

WO     WO-0072464 A1     11/2000

OTHER PUBLICATIONS

Nagaraj S., et al., "Antenna verification for closed loop transmit diversity in UMTS," IEEE 60th Vehicular Technology Conference, Sep. 2004, vol. 5, pp. 3792-3796.

(Continued)

*Primary Examiner* — Esaw Abraham
(74) *Attorney, Agent, or Firm* — Loza & Loza LLP

(57) ABSTRACT

Access terminals are adapted to facilitate closed-loop transmit diversity in wireless communications systems. According to one example, an access terminal can calculate an uplink error rate for even slot indexes and a separate uplink error rate for odd slot indexes in an uplink frame to be transmitted. A respective downlink error rate can be estimated for an in-phase (I) component and a quadrature-phase (Q) component of a downlink transmission. The access terminal may further estimate a phase-related weight that was applied to the downlink transmission based on the downlink error rates and the uplink error rates. Other aspects, embodiments, and features are also included.

22 Claims, 5 Drawing Sheets

(56) References Cited

U.S. PATENT DOCUMENTS

| | | | |
|---|---|---|---|
| 7,352,271 B2* | 4/2008 | Nemoto | G01B 7/012 33/505 |
| 7,352,832 B1* | 4/2008 | Lewis | H04L 25/06 375/345 |
| 7,403,584 B2* | 7/2008 | Koenenkamp | H03L 7/0814 375/354 |
| 7,412,011 B2* | 8/2008 | Luo | H04B 7/0634 375/130 |
| 7,558,580 B2 | 7/2009 | Han | |
| 8,204,463 B2 | 6/2012 | Isaac | |
| 8,285,234 B2 | 10/2012 | Ishii | |
| 8,526,523 B1* | 9/2013 | Eliaz | H04L 25/03178 375/261 |
| 8,917,786 B1* | 12/2014 | von der Embse | H04L 1/0047 375/260 |
| 9,008,237 B2* | 4/2015 | Eder | H04B 7/0452 375/224 |
| 9,197,364 B1* | 11/2015 | von der Embse | H04L 27/34 |
| 2003/0142755 A1 | 7/2003 | Chi et al. | |

OTHER PUBLICATIONS

Sarkiss M., et al., "MAP-DFE Detector for Downlink V-BLAST MC-CDMA Systems," IEEE 64th Vehicular Technology Conference, 2006, pp. 1-5.

International Search Report and Written Opinion—PCT/US2014/058636—ISA/EPO—Dec. 15, 2014.

* cited by examiner

DEVICES AND METHODS FOR FACILITATING CLOSED-LOOP TRANSMISSION DIVERSITY IN WIRELESS COMMUNICATIONS SYSTEMS

PRIORITY CLAIM

The present application for patent claims priority to Provisional Application No. 61/885,888 entitled "Closed Loop Transmit Diversity Uplink Error Rate Determination Enhancement" filed Oct. 2, 2013, and assigned to the assignee hereof and hereby expressly incorporated by reference herein for all applicable purposes.

TECHNICAL FIELD

The technology discussed below relates generally to wireless communications, and more specifically to methods and devices for facilitating closed-loop transmit diversity.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. For example, recent interest has been directed to transmit diversity schemes, which employ more than one transmit antenna (usually two) at the transmitter to improve the transmission performance by, for example, reducing transmit power, increasing coverage range, increasing data rate, or a combination of the above. Transmit diversity can also help improve the overall system capacity. However, due to the wide variety of implementations of transmit diversity schemes, there remains substantial developmental effort to improve and enhance these systems.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate improvements to closed-loop transmit diversity (CLTD) schemes in wireless communications systems. According to at least one example, an access terminal may include a communications interface and a storage medium, both coupled with a processing circuit. The processing circuit may be adapted to calculate an uplink error rate for even slot indexes and a separate uplink error rate for odd slot indexes in an uplink frame to be transmitted via the communications interface. The processing circuit may further be adapted to estimate a respective downlink error rate for an in-phase (I) component and a quadrature-phase (Q) component of a downlink transmission. Based on the downlink error rates and the uplink error rates, the processing circuit may be adapted to estimate a phase-related weight that was applied to the downlink transmission.

Further aspects provide methods operational on access terminals and/or access terminals including means to perform such methods. One or more examples of such methods may include computing an uplink error rate for even slot indexes and a separate uplink error rate for odd slot indexes in an uplink frame to be transmitted by an access terminal. A respective downlink error rate for an in-phase (I) component and a quadrature-phase (Q) component of a downlink transmission may also be estimated. Based on the downlink error rates and the uplink error rates, a phase-related weight that was applied to the downlink transmission may be estimated.

Still further aspects include processor-readable storage mediums including programming executable by a processing circuit. According to one or more examples, such programming may be adapted for causing the processing circuit to calculate an uplink error rate for even slot indexes and a separate uplink error rate for odd slot indexes in an uplink frame to be transmitted by an access terminal, and estimate a respective downlink error rate for an in-phase (I) component and a quadrature-phase (Q) component of a downlink transmission. The programming may further be adapted for causing the processing circuit to estimate a phase-related weight that was applied to the downlink transmission based on the downlink error rates and the uplink error rates.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS and 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
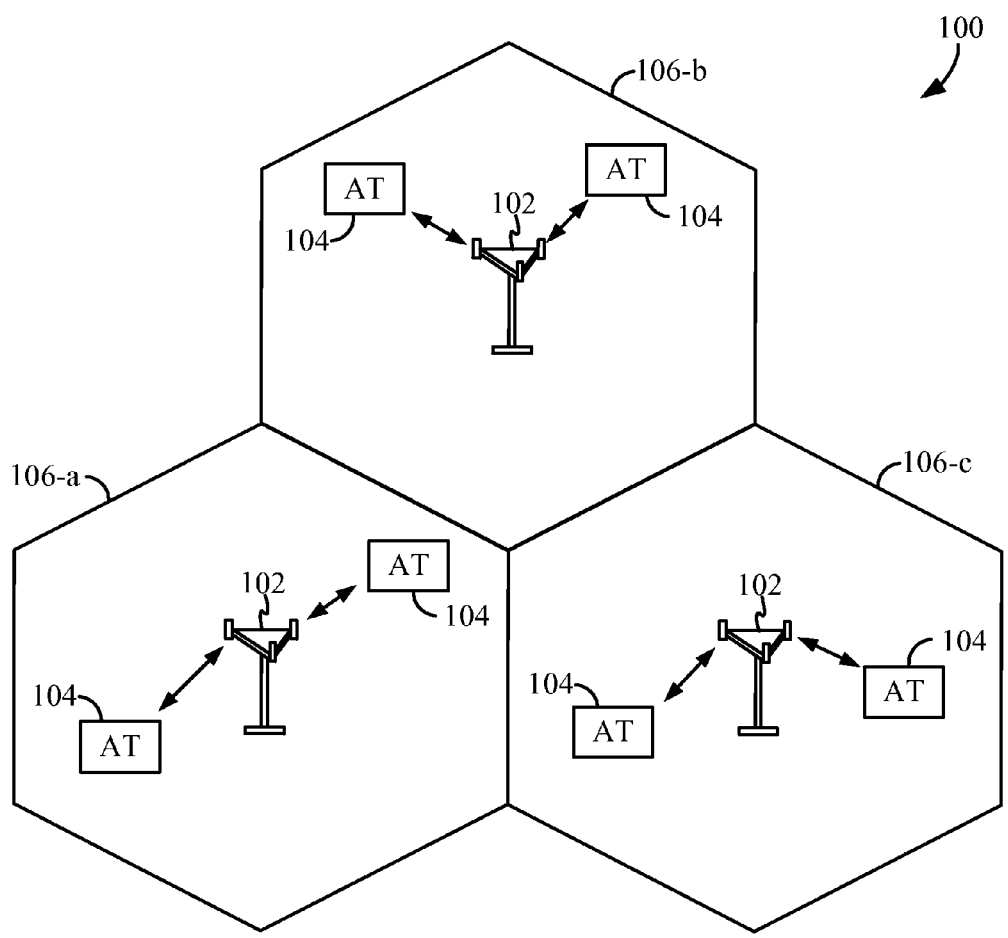
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
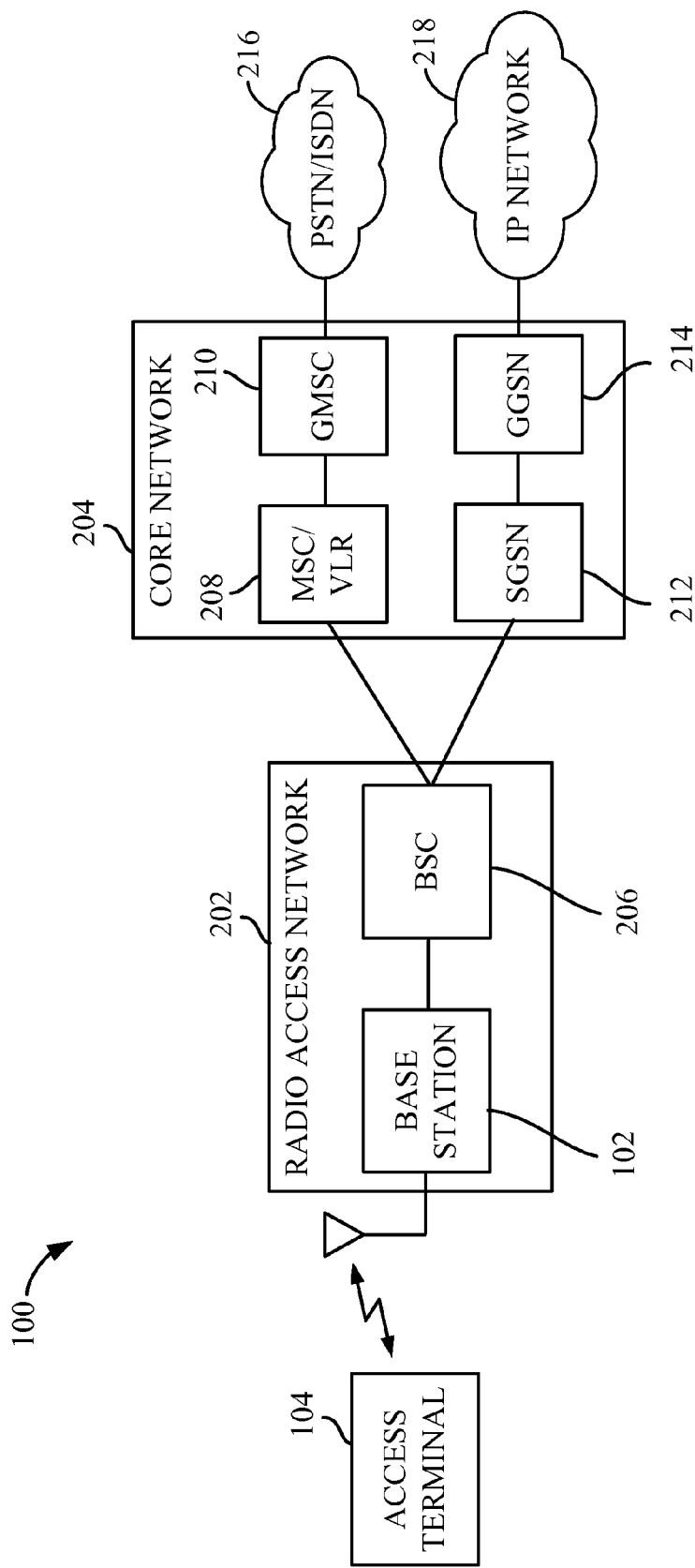
FIG. 2 is a block diagram illustrating select components of the wireless communication system of FIG. 1 according to at least one example.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, sensor, sensing device, wearable device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As base stations 102 communicate with access terminals 104 within the wireless communications system 100, one or more transmit diversity schemes may be employed to improve RF performance. Transmit diversity schemes typically employ multiple transmit antennas to improve the wireless link performance, by reducing transmit power, increasing the coverage range, increasing data rates, or any combination of improvements. Transmit diversity can also help improve the overall system capacity. Based on feedback requirements, transmit diversity schemes can be categorized into closed-loop and open-loop schemes.

Closed-loop transmission diversity (CLTD) generally involves a transmitter employing more than one transmit antenna (typically two, where the second antenna is called a diversity antenna) to transmit a signal. To assist the transmitter in selecting a transmission format, such as a weight factor (corresponding to a phase adjustment) to apply on the diversity antenna, the receiving device provides explicit feedback information to the transmitting device about the spatial channel. In the downlink channel, the transmitter may be the base station 102 and the receiver may be the access terminal 104.

Figure 3:
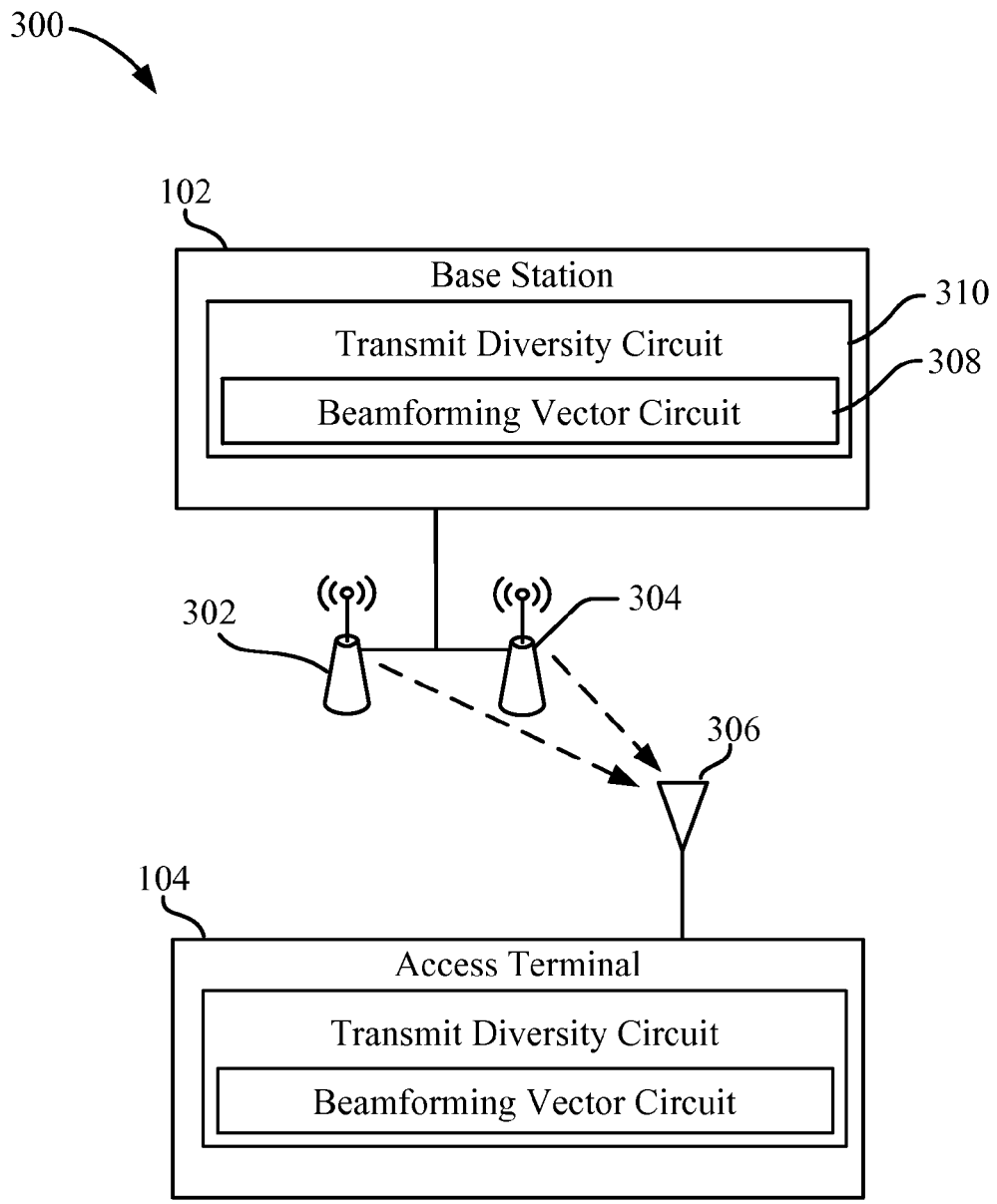
FIG. 3 is a block diagram illustrating a transmit diversity configuration for communications from a base station to an access terminal.

Referring to FIG. 3, a simplified block diagram is depicted, illustrating one example of a wireless communications system 300 adapted to facilitate closed loop transmit diversity (CLTD). As shown, a base station 102 may provide a wireless access point to a core network for any number of mobile apparatuses, such as the access terminal 104. The base station 102 may conduct downlink communication to the access terminal 104 using transceivers and one or more antennas (e.g., antennas 302, 304).

At the access terminal 104, the downlink communication may be received via one or more antennas 306 and transceivers. The downlink communication may provide information that includes a precoding (or beamforming) weight vector in order that the signals received at the access terminal 104 are constructively added, which in turn can improve the receiver signal to noise ratio (SNR) and achieve a beamforming effect. The access terminal 104 may provide information in an uplink (UL) communication to the base station 102 via transceivers and the antenna 306, where the information communicated from the access terminal 104 to the base station 102 may include feedback information about the spatial channel, such as a beamforming weight vector.

The base station 102 may receive the beamforming weight vector, and the beamforming vector circuit 308 may apply the beamforming weight vector information to one or more data channels and/or one or more control channels. The data channels may include one or more high-speed dedicated physical data channels (HS-DPDCH), one or more R99 dedicated physical data channels (DPDCH), etc. The control channels may include one or more high-speed dedicated physical control channels (HS-DPCCH), etc.

When closed-loop transmit diversity (CLTD) is enabled, the access terminal 104 may provide feedback information related to the channel used by the network to control the phase of the transmissions on a first (primary) transmitter antenna (Tx0) 302. The network may control the phase of the transmitted channel by applying one of four preset weights on the signal based on the feedback. In time slots having even indexes, the access terminal 104 may feedback a single bit which the network uses to control the sign of the in-phase (I) component of the weight applied on the transmitted channel for a second (diversity) transmitter antenna (Tx1) 304. In time slots having odd slot indexes, the access terminal 104 may feedback a single bit used to control the quadrature-phase (Q) component of the DPCH for the second transmitter antenna 304. Under this scheme, the signal from the first transmitter antenna (Tx0) 302 is not modified.

At the access terminal 104 side, antenna verification (AV) is performed to validate that the feedback information transmitted by the access terminal 104 on the uplink has been interpreted correctly by the base station 102. The access terminal 104 typically performs such validation by estimating the weight applied by the base station 102, using a maximum a posteriori (MAP) estimate algorithm which dynamically adjusts the threshold for determination based on the downlink and uplink error rate estimate at the access terminal 104.

The latter method of threshold adjustment treats even and odd slots equally. Accordingly, I and Q components are assumed to have equal error probabilities. However, the phase of the received signal may be such that most of the energy is transmitted on one phase (e.g., on even slots, or on odd slots) due to the combining of the Tx0 and Tx1 signals. As a result, the antenna verification for the I component may be more reliable than that for the Q component, or vice versa.

Figure 4:
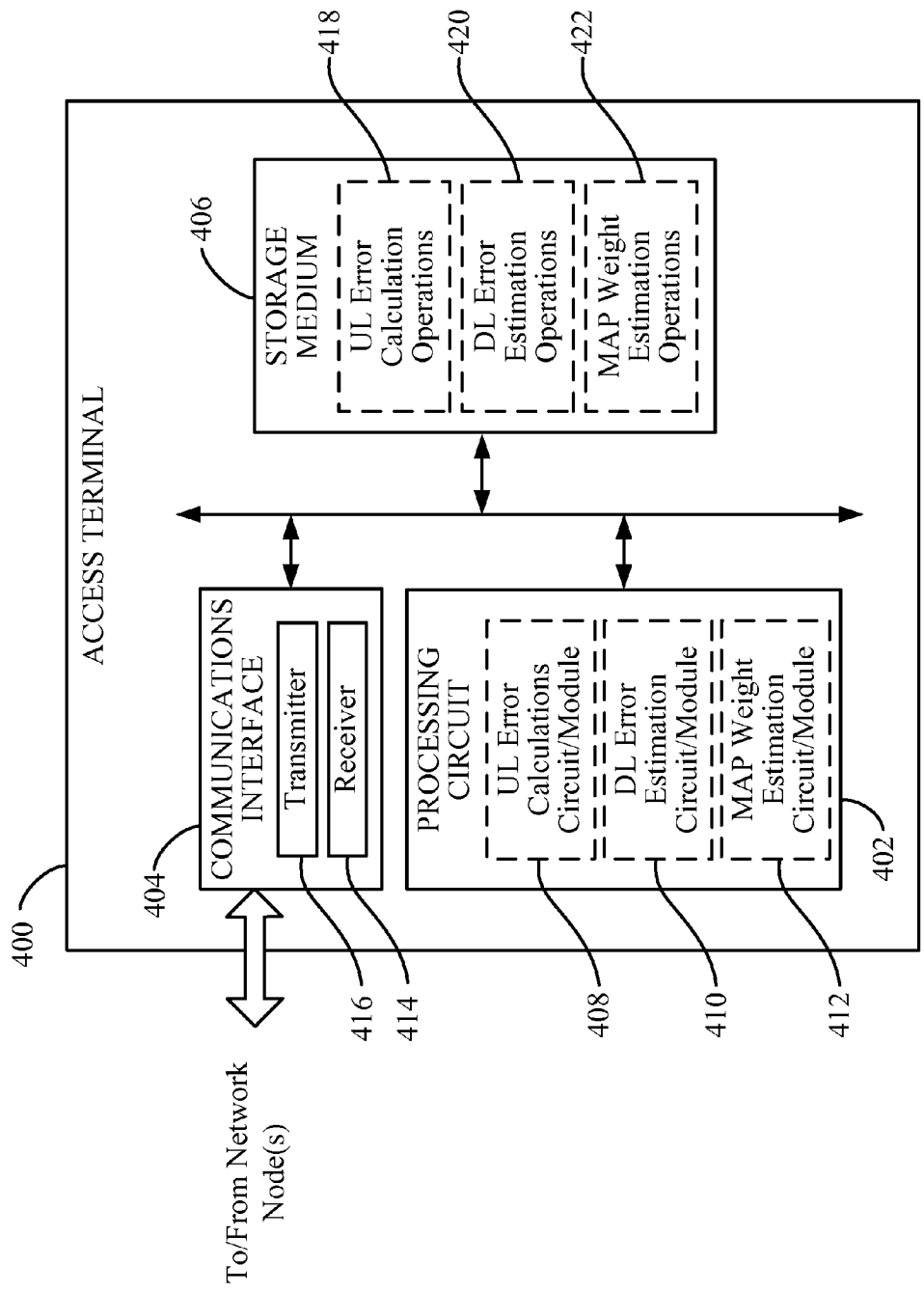
FIG. 4 is a block diagram illustrating select components of an access terminal according to at least one example.

According to at least one aspect of the disclosure, access terminals are adapted to determine the uplink error rate and/or the downlink error rate independently to address the I/Q imbalance. Turning to FIG. 4, a block diagram is shown illustrating select components of an access terminal 400 according to at least one example of the present disclosure. The access terminal 400 includes a processing circuit 402 coupled to or placed in electrical communication with a communications interface 404 and a storage medium 406.

The processing circuit 402 is arranged to obtain, process and/or send data, control data access and storage, issue commands, and control other desired operations. The processing circuit 402 may include circuitry adapted to implement desired programming provided by appropriate media, and/or circuitry adapted to perform one or more functions described in this disclosure. For example, the processing circuit 402 may be implemented as one or more processors, one or more controllers, and/or other structure configured to execute executable programming and/or functions. Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 402 may include an uplink (UL) error calculations circuit and/or module 408, a downlink (DL) error estimation circuit and/or module 410, and/or a maximum a posteriori (MAP) estimation circuit and/or module 412. The uplink (UL) error calculations circuit/module 408 may include circuitry and/or programming (e.g., programming stored on the storage medium 406) adapted to compute separate uplink error probabilities for even and odd slot indexes in an uplink frame. The downlink (DL) error estimation circuit/module 410 may include circuitry and/or programming (e.g., programming stored on the storage medium 406) adapted to estimate respective downlink error probabilities for I and Q components of a downlink transmission. The maximum a posteriori (MAP) estimation circuit and/or module 412 may include circuitry and/or programming (e.g., programming stored on the storage medium 406) adapted to estimate phase-related weights applied to downlink transmissions based on the calculated downlink error probabilities and the estimated uplink error probabilities.

The communications interface 404 is configured to facilitate wireless communications of the access terminal 400. For example, the communications interface 404 may include circuitry and/or programming adapted to facilitate the communication of information bi-directionally with respect to one or more wireless network devices (e.g., network nodes). The communications interface 404 may be coupled to one or more antennas (not shown), and includes wireless transceiver circuitry, including at least one receiver circuit 414 (e.g., one or more receiver chains) and/or at least one transmitter circuit 416 (e.g., one or more transmitter chains).

The storage medium 406 may represent one or more processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing and/or carrying programming By way of example and not limitation, the storage medium 406 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the access terminal 400, external to the access terminal 400, distributed across multiple entities).

Programming stored by the storage medium 406, when executed by the processing circuit 402, causes the processing circuit 402 to perform one or more of the various functions and/or process steps described herein. In at least some examples, the storage medium 406 may include uplink (UL) error calculation operations 418, downlink (DL) error estimation operations 420, and/or maximum a posteriori (MAP) estimation operations 422. The uplink (UL) error calculation operations 418 can be adapted to cause the processing circuit 402 to compute separate uplink error probabilities for even and odd slot indexes in an uplink frame. The downlink (DL) error estimation operations 420 can be adapted to cause the processing circuit 402 to estimate respective downlink error probabilities for I and Q components of a downlink transmission. The maximum a posteriori (MAP) estimation operations 422 can be adapted to cause the processing circuit 402 to estimate phase-related weights applied to downlink transmissions based on the calculated downlink error probabilities and the estimated uplink error probabilities. Thus, according to one or more aspects of the present disclosure, the processing circuit 402 is adapted to perform (in conjunction with the storage medium 406) any or all of the processes, functions, steps and/or routines for any or all of the access terminals described herein (e.g., access terminal 104, access terminal 400). As used herein, the term "adapted" in relation to the processing circuit 402 may refer to the processing circuit 402 being one or more of configured, employed, implemented, and/or programmed (in conjunction with the storage medium 406) to perform a particular process, function, step and/or routine according to various features described herein.

In operation, the access terminal 400 can compute independent uplink error rates for even and odd slot indexes, and estimate the downlink error rate for each of the respective I and Q components. Such computations can result in independent maximum a posteriori (MAP) thresholds for the I and Q branches in the maximum a posteriori (MAP) based antenna verification (AV) algorithm. In some implementations, the independent MAP thresholds for the respective I and Q branches may be used in a MAP-based antenna verification (AV) algorithm. The independent MAP thresholds may be used independently for the MAP algorithm, or the independent MAP thresholds can be combined to obtain a single threshold for use with the MAP algorithm.

More specifically, the probability of uplink error may be calculated separately for even and odd slots, and the downlink error probability may be estimated for respective I and Q components. In some examples, the MAP threshold for antenna verification may then be calculated separately for the I and Q components using the downlink I and Q error probabilities and uplink error probabilities for even and odd slots. Separate thresholds may be applied for I and Q components. In other examples, a combined MAP threshold for antenna verification may be generated by combining thresholds for the I and Q components. The combined MAP threshold may be applied for all slots while antenna verification is performed.

Figure 5:
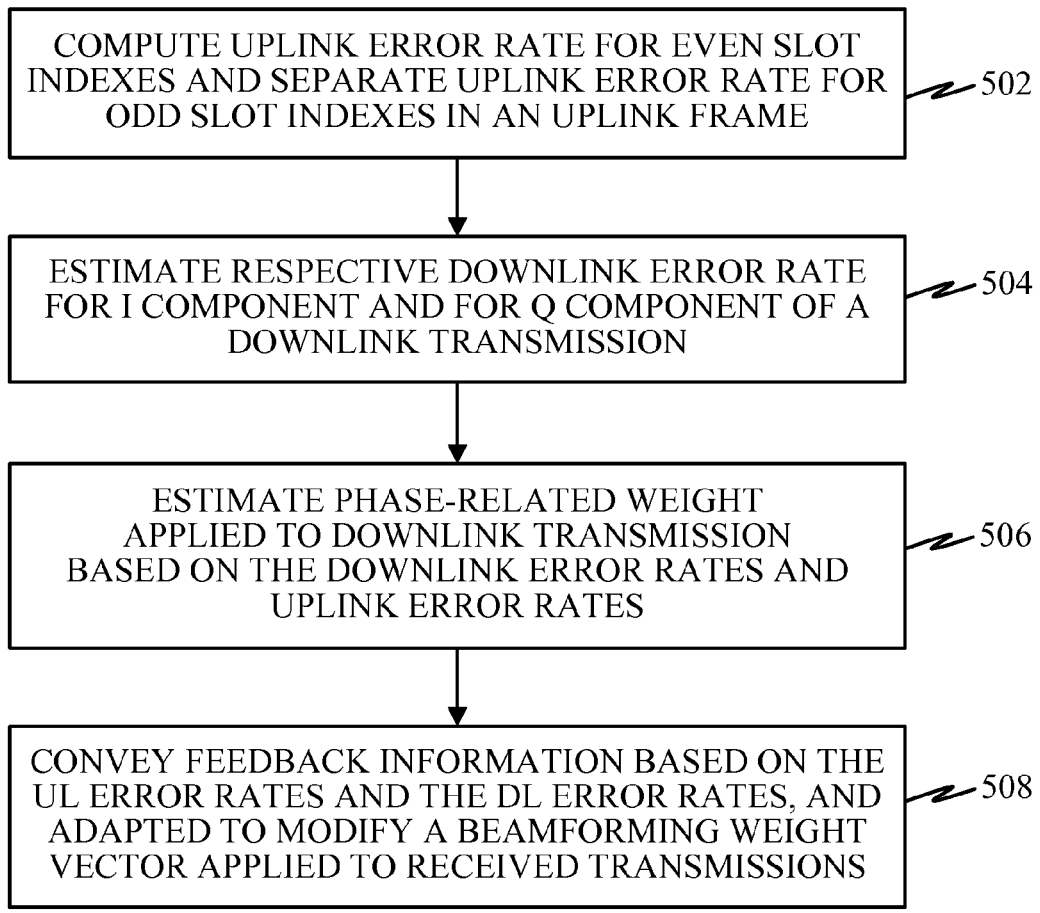
FIG. 5 is a flow diagram illustrating a method operational on an access terminal according to at least one example.

FIG. 5 is a flow diagram illustrating at least one example of a method operational on an access terminal, such as the access terminal 400. Referring to FIGS. 4 and 5, an access terminal 400 can compute a separate uplink error rate for even and odd slot indexes in an uplink frame at 502. For example, the processing circuit 402 (e.g., the UL error calculations circuit/module 408) executing the UL error calculation operations 418 may calculate an uplink error rate for the even slot indexes in an uplink frame, and a separate uplink error rate for the odd slot indexes in the uplink frame. In at least one example, an estimate for the UL error rate may be calculated by comparing the expected closed-loop transmission diversity (CLTD) weight to be used by the network (based on previously transmitted feedback information) and the estimated actual weight that is used by the network. By comparing the expected in-phase (I) and a quadrature-phase (Q) components with the estimated actual in-phase (I) and a quadrature-phase (Q) components, the processing circuit 402 (e.g., the UL error calculations circuit/module 408) executing the UL error calculation operations 418 can obtain an estimate of the UL error ratio for the in-phase (I) component and a quadrature-phase (Q) component.

At 504, the access terminal 400 can estimate a respective downlink error rate for the in-phase (I) component and the quadrature-phase (Q) component of a downlink transmission. For example, the processing circuit 402 (e.g., the DL error estimation circuit/module 410) executing the DL error estimation operations 420 may determine an estimated downlink error rate for the I component and a downlink error rate for the Q component of a downlink transmission. In at least one example, an estimate for the downlink error rate may be determined by utilizing the aspect that the in-phase (I) and quadrature-phase (Q) components of the closed-loop transmission diversity (CLTD) weight are updated every other slot (since one bit is feedback to the network every slot to update either the in-phase (I) component or the quadrature-phase (Q) component). As a result, the processing circuit 402 (e.g., the DL error estimation circuit/module 410) executing the DL error estimation operations 420 can compare the in-phase (I) component or the quadrature-phase (Q) component part for two slots when they should be the same, and can keep a count of the number of times that they two slots are different. By counting the number of times that the two slots that should be same are actually different, the processing circuit 402 (e.g., the DL error estimation circuit/module 410) executing the DL error estimation operations 420 can calculate an estimate of the downlink error rate for each of the in-phase (I) and quadrature-phase (Q) components.

At 506, the access terminal 400 can estimate a phase-related weight applied to the downlink transmission based on the downlink error rates and the uplink error rates. For example, the processing circuit 402 (e.g., the MAP weight estimation circuit/module 412) executing the MAP weight estimation operations 422 may estimate the phase-related weight applied to the downlink transmission based on the downlink error rates estimated for the respective I and Q components at 504, and the uplink error rates calculated for the even and odd slot indexes and 502. In at least some implementations, the phase-related weight may be estimated using a maximum a posteriori (MAP) estimate algorithm. A phase-related weight can be estimated for each of the I and Q components of the downlink transmission.

In some examples, the access terminal 400 may compute thresholds associated with the I and Q components of the downlink transmission. The respective thresholds may be estimated using the MAP estimate algorithm.

In some implementations, the access terminal 400 may employ the respective I and Q thresholds to antenna verification for the related component. For instance, the access terminal 400 may apply the threshold associated with the I component to antenna verification for the I component of the downlink transmission. Similarly, the access terminal 400 may apply the threshold associated with the Q component to antenna verification for the Q component of the downlink transmission.

In other implementations, the access terminal 400 may compute a threshold for antenna verification by combining the thresholds associated with the I and Q components. For instance, the thresholds associated with the I and Q components of the downlink transmission can be combined based on a ratio of received signal powers of the respective I and Q components.

At 508, the access terminal 400 can further provide feedback information to a network entity, where the feedback information is adapted to modify a beamforming weight vector applied to transmissions sent to the access terminal 400. For example, the processing circuit 402 can be adapted to transmit feedback information via the transmitter 416 of the communications interface 404. The feedback information can be based on the estimated downlink error rates and the computed uplink error rates.

While the above discussed aspects, arrangements, and embodiments are discussed with specific details and particularity, one or more of the components, steps, features and/or functions illustrated in FIGS. 1, 2, 3, 4, and/or 5 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 3, and/or 4 may be configured to perform or employ one or more of the methods, features, parameters, and/or steps described in FIG. 5. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
    a communications interface;
    a storage medium; and
    a processing circuit coupled to the communications interface and the storage medium, the processing circuit configured to:
        calculate an uplink error rate for even slot indexes and a separate uplink error rate for odd slot indexes in an uplink frame to be transmitted via the communications interface;
        estimate a respective downlink error rate for an in-phase (I) component and a quadrature-phase (Q) component of a downlink transmission;
        estimate a phase-related weight that was applied to the downlink transmission based on the downlink error rates and the uplink error rates; and
        compute a threshold for antenna verification by combining thresholds associated with the I component and the Q component of the downlink transmission based on a ratio of received signal powers of the I component and the Q component.

2. The access terminal of claim 1, wherein the phase-related weight is estimated using a maximum a posteriori (MAP) estimate algorithm.

3. The access terminal of claim 1, wherein the phase-related weight comprises phase-related weights estimated separately for the I component and for the Q component of the downlink transmission.

4. The access terminal of claim 3, wherein the processing circuit is further configured to:
    compute a threshold for antenna verification for the I component based on the downlink error rates and the uplink error rates;
    compute a threshold for antenna verification for the Q component based on the downlink error rates and the uplink error rates;
    apply the threshold associated with the I component to antenna verification for the I component; and
    apply the threshold associated with the Q component to antenna verification for the Q component.

5. The access terminal of claim 1, wherein the processing circuit is further configured to:
    transmit via the communications interface feedback information adapted to modify a beamforming weight vector applied to transmissions received by the communications interface based on the downlink error rates and the uplink error rates.

6. The access terminal of claim 1, wherein the estimating the respective downlink error rate for the I component and the Q component of the downlink transmission comprises:
    comparing the I component or the Q component for at least two slots; and
    counting a number of times that the at least two slots are different.

7. The access terminal of claim 6, wherein the calculating the uplink error rate for even slot indexes and the separate uplink error rate for odd slot indexes comprises:
    comparing an expected closed-loop transmission diversity (CLTD) weight to be used by the network, based on a previously transmitted feedback information, and an estimated actual weight that is used by the network.

8. A method operational on an access terminal comprising a processing circuit, the method comprising:
    utilizing an uplink error calculations circuit of the processing circuit to compute an uplink error rate for even slot indexes and a separate uplink error rate for odd slot indexes in an uplink frame to be transmitted by the access terminal;
    utilizing a downlink error estimation circuit of the processing circuit estimate a respective downlink error rate for an in-phase (I) component and a quadrature-phase (Q) component of a downlink transmission;
    utilizing a weight estimation circuit of the processing circuit to estimate a phase-related weight that was applied to the downlink transmission based on the downlink error rates and the uplink error rates; and
    utilizing the processing circuit to compute a threshold for antenna verification by combining thresholds associated with the I component and the Q component of the downlink transmission based on a ratio of received signal powers of the I component and the Q component.

9. The method of claim 8, wherein the estimating the phase-related weight comprises:
    estimating a phase-related weight with a maximum a posteriori (MAP) estimate algorithm.

10. The method of claim 8, wherein the estimating the phase-related weight comprises:
    estimating separately the I component and the Q component of the downlink transmission.

11. The method of claim 10, further comprising utilizing the processing circuit to:
    calculate a threshold for use in antenna verification for the I component based on the downlink error rates and the uplink error rates;
    calculate a threshold for use in antenna verification for the Q component based on the downlink error rates and the uplink error rates;
    apply the threshold associated with the I component to antenna verification for the I component; and
    apply the threshold associated with the Q component to antenna verification for the Q component.

12. The method of claim 8, further comprising utilizing the processing circuit to:
    transmit feedback information adapted to modify a beamforming weight vector applied to received transmissions, wherein the feedback information is based on the estimated downlink error rates and the computed uplink error rates.

13. An access terminal, comprising:
    means for computing an uplink error rate for even slot indexes and a separate uplink error rate for odd slot indexes in an uplink frame to be transmitted by the access terminal;

means for estimating a respective downlink error rate for an in-phase (I) component and a quadrature-phase (Q) component of a downlink transmission;

means for estimating a phase-related weight that was applied to the downlink transmission based on the downlink error rates and the uplink error rates; and means for computing a threshold for antenna verification by combining thresholds associated with the I component and the Q component of the downlink transmission based on a ratio of received signal powers of the I component and the Q component.

14. The access terminal of claim 13, wherein the phase-related weight is estimated using a maximum a posteriori (MAP) estimate algorithm.

15. The access terminal of claim 13, wherein the phase-related weight comprises phase-related weights estimated separately for the I component and for the Q component of the downlink transmission.

16. The access terminal of claim 15, further comprising:

means for computing a threshold for antenna verification for the I component based on the downlink error rates and the uplink error rates;

means for computing a threshold for antenna verification for the Q component based on the downlink error rates and the uplink error rates;

means for applying the threshold associated with the I component to antenna verification for the I component; and means for applying the threshold associated with the Q component to antenna verification for the Q component.

17. The access terminal of claim 13, further comprising:

means for transmitting feedback information adapted to modify a beamforming weight vector applied to transmissions received by the access terminal based on the downlink error rates and the uplink error rates.

18. A processor-readable storage medium, comprising programming for causing a processing circuit to:

calculate an uplink error rate for even slot indexes and a separate uplink error rate for odd slot indexes in an uplink frame to be transmitted by an access terminal;

estimate a respective downlink error rate for an in-phase (I) component and a quadrature-phase (Q) component of a downlink transmission;

estimate a phase-related weight that was applied to the downlink transmission based on the downlink error rates and the uplink error rates; and compute a threshold for antenna verification by combining thresholds associated with the I component and the Q component of the downlink transmission based on a ratio of received signal powers of the I component and the Q component.

19. The processor-readable storage medium of claim 18, wherein the phase-related weight is estimated using a maximum a posteriori (MAP) estimate algorithm.

20. The processor-readable storage medium of claim 18, wherein phase-related weights are estimated separately for the I component and for the Q component of the downlink transmission.

21. The processor-readable storage medium of claim 20, further comprising programming for causing the processing circuit to:

compute a threshold for antenna verification for the I component based on the downlink error rates and the uplink error rates;

compute a threshold for antenna verification for the Q component based on the downlink error rates and the uplink error rates;

apply the threshold associated with the I component to antenna verification for the I component; and apply the threshold associated with the Q component to antenna verification for the Q component.

22. The processor-readable storage medium of claim 18, further comprising programming for causing the processing circuit to:

transmit feedback information adapted to modify a beamforming weight vector applied to transmissions received by the access terminal based on the downlink error rates and the uplink error rates.

* * * * *